//

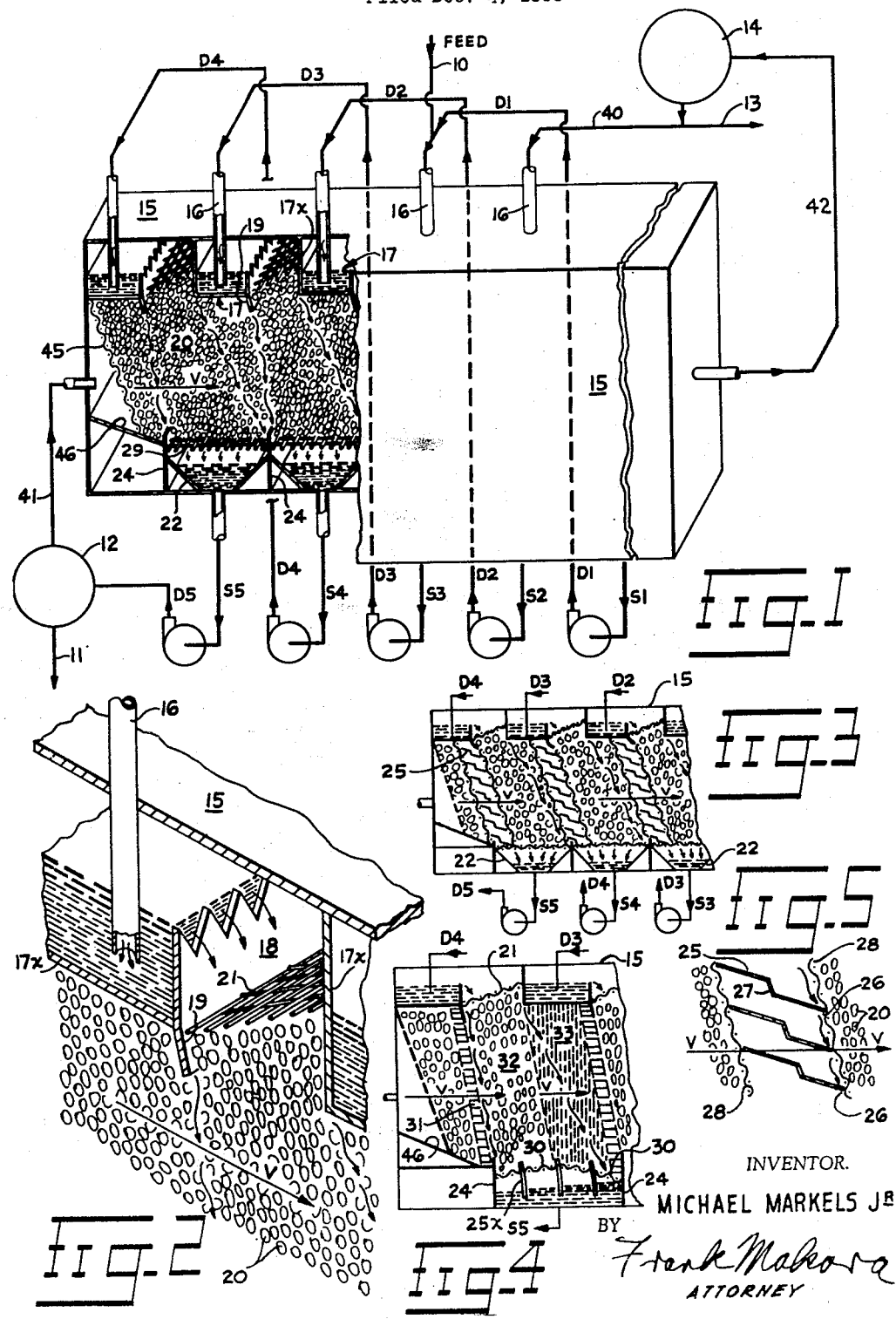
July 26, 1960    M. MARKELS, JR    2,946,726
HORIZONTAL DISTILLATION APPARATUS
Filed Dec. 4, 1958
INVENTOR.
MICHAEL MARKELS JR
BY Frank Makora
ATTORNEY

United States Patent Office 2,946,726
Patented July 26, 1960

2,946,726

HORIZONTAL DISTILLATION APPARATUS

Michael Markels, Jr., 1017 Woodside Drive, Alexandria, Va.

Filed Dec. 4, 1958, Ser. No. 778,209

4 Claims. (Cl. 202—158)

This invention relates to horizontal distillation apparatus.

It is an object of this invention to provide a horizontal distillation apparatus adapted to receive a full packing of discrete packing material.

It is another object to provide an apparatus for horizontal distillation of inexpensive yet highly efficient construction.

These and other objects of this invention will become apparent upon reading the following detailed description in connection with the accompanying drawing in which;

Fig. 1 is a schematic view, broken away in part, to show the interior of the horizontal distillation column and of the manner of disposing the packing and of circulating the liquid therein, Fig. 2 is a detailed view of the manner of cascading liquid through a specific stage or portion of the column, Fig. 3 is a schematic cross-sectional view of a modified apparatus, Fig. 4 is a schematic cross-sectional view of another modification, and Fig. 5 is a detailed view of the louver device shown in Fig. 3.

In this invention the inlet feed of for example, a two component liquid mixture of water and alcohol is introduced into the top inlet conduit 10 of the column at the middle thereof (Fig. 1).

The water upon separation is removed by way of conduit 11 from the boiler 12 and the alcohol is removed by way of conduit 13 after condensation in condenser 14.

In short the alcohol-water mixture of, for example, 50 percent ethyl alcohol becomes richer in alcohol as the vapor stream progresses toward the condenser 14 and becomes richer in water as the liquid stream progresses toward boiler 12.

Fig. 1 shows five stages of a horizontal column having many more stages therein.

The feed from inlet conduit 10 is mixed with liquid in conduit D–1 pumped from the conduit S–1 from the last stage by a conventional centrifugal pump. The liquid is introduced into the rectangular longitudinal distillation column 15 through a stage inlet pipe 16 into a weir tank 17 having a weir wall 18 (Fig. 2) having a saw-tooth edge forming thereby a series of interconnected weirs. Wall 18 is welded to the right angle wall 17X which in turn is welded to the top and side walls of the shell or column 15. Preferably wall 18 is provided with a deflection skirt or baffle 19 for directing the flow of liquid from the weirs at a suitable angle into the packing particles 20 filling completely the column 15 up to and also in between the tanks 17. The particles 20 may be any of the conventional packing material used in conventional vertical distillation columns, such as Raschig rings, spirals of stainless steel, clay balls or spirals, etc.

As shown in Fig. 2 the tank 17 does not extend longitudinally throughout the top of a respective stage since the weir wall 18 is suitably disposed away from the back of wall 17X of the adjacent stage.

Preferably the horizontal portion of the angled wall 17X of tank 17 extends about one-half the width of a stage leaving an over-flow or free space partly filled with packing and upon which there preferably is disposed a suitable screen 21.

As shown in Fig. 1 the over-flow over the weir wall 18 is collected in a respective trough or sump tank 22 of a length equal to that of a stage. Sump tanks 22 may be formed by a pair of divergent plates 23 disposed between suitable transverse stage separation walls 24 welded to the bottom wall of column 15. However as shown in Fig. 4 the separator walls 24 may form the trough plates. Where the troughs are formed by the vertical walls 24 (Fig. 4) preferably a plurality of transverse walls or baffles 25X are welded to the opposed side walls and disposed suitably above the bottom wall of the column 15 to prevent by-pass of vapor through the sump tanks. The liquid level in a trough 25 employing transverse walls 25X increases in the direction of the vapor flow (Fig. 4).

As shown in Fig. 1, the horizontal shell or column 15 is substantially solidly packed from the boiler or vapor inlet and to the vapor outlet or condenser end.

On the other hand a sharp line of demarcation may be and preferably is effected between the respective stages by the use of mechanical separation means such as louvers or said separation may be effected by the use of different sized or differently configurated packing material.

As shown in Figs. 3 and 5 a plurality of suitably sloped spaced-apart louvers 25 are suitably angularly disposed between a depending skirt 19 of wall 18 and the edge of a respective trough 22. The louvers are so sloped and so over-lapped as to direct the flow of liquid over the entire leading edges 26 of each of said louvers.

The louvers 25 provide in effect a non-uniform full packing of the column 15. Each louver 25 is preferably provided with an integral step or tread wall 27 substantially in the middle thereof to prevent travel of liquid upwardly into the adjacent stage and to present Venturi effect causing a minimum vapour pressure drop therethrough. The louvers 25 are preferably welded to the opposed side walls of the column 15. A screen 28 is transversely disposed on each side of a sloping column of overlapping louvers thereby preventing the packing material from being disposed between the individual louvers.

As shown in Fig. 1, a suitable screen 29 is deposited in a trough 22 suitably below the top edges of transverse walls 24 so as to prevent horizontal travel of vapor through the troughs. As will be seen in Fig. 4 a plurality of screens 30 may be used between the baffles 25 since these baffles extend into the packing material as well as into the liquid in the troughs 22 thereby preventing passage of vapors through said troughs.

The column 15 is substantially fully packed with foraminous material. Passage of vapor at the top of the column is prevented by use of the baffle 19 along with the extended placing of packing material between weir wall 18 and the wall 17X of an adjacent tank 17.

As shown in Fig. 4, a plurality of sloping transverse layers of different packing material may be employed especially where the liquid flow rate and the vapor flow rate are subject to wide variation during operation. Thus packing material 31 is preferably a high density material, for example, a series of suitable baffles or slats suitably stacked over one another but packing material 32, disposed against material 31, is high performance packing to effect maximum contact of vapor with liquid film.

Packing material 32 may be particulate material or it may consist of suitable non-particulate material such as wire screen, expanded metal, slats or baffles. Packing material 33 disposed against material 32 is a high void material to effect disentrainment of liquid from vapor and consists of the material used as packing material 32 but made in a more open and therefore less dense form.

In operation some of the condensate from condenser 14 passes through conduit 40 into the first stage relative to the product and falls sloping due to the vapour stream and gravity to a trough whence it passes into conduit S–1 to be pumped by any conventional pump into condiut D–1 and then into the tank 17 of the second stage adjacent to the first stage tank. This liquid cycle is repeated in each stage until the liquid collected in trough 22 of the fifth stage is pumped through conduit D–5 into the boiler 12. The boiler 12 at this point contains a minmum of the low boiling constituent for example, ethyl alcohol. From the boiler 12 the vapors, containing a maximum of low boiling material, are passed through conduit 41 into the boiler or inlet end of the column 15. These vapors pass horizontally as a flowing stream from the boiler end to the vapour out end of the column 15 being successively scrubbed of their higher boiling component for example, water as they pass through the falling liquid of the various stages.

Finally the vapor containing a maximum of low boiling component for example, alcohol leaves the column 15 by conduit 42 and goes into the condenser 14. A portion of the condensate is taken off through conduit 13 as final product and a portion is returned to the column 15 by conduit 40.

The inlet end of column 15 is provided with a sloped screen 45 to retain the particles 20 as well as with a sloped floor 46 to direct the flow of any liquid from the inlet conduit 41.

This application is a continuation-in-part of my application Serial No. 586,046, filed May 21, 1956, now U.S. Patent No. 2,863,808. However, this invention is of generic scope and therefore is not limited to the illustrative embodiments herein.

I claim:

1. A distillation apparatus for separating a mixture of compounds of low and of high boiling points comprising a horizontal longitudinal tube; an apertured vapor inlet closure secured in air tight manner to one end of said tube; an apertured vapor outlet closure secured in in air tight manner to the other end of said tube; packing material substantially completely filling said tube; a plurality of spaced-apart weir tanks disposed transversely within the top of said tube; a like number plurality of spaced-apart sump tanks disposed transversely within the bottom of said tube in off-set relationship to said weir tanks to collect the overflow of each respective weir tank; a pump disposed between each respective weir tank and the co-acting sump tank for conveying liquid toward said inlet closure from the bottom of one sump tank to the top of the adjacent weir tank and a liquid mixture feed inlet disposed intermediate said closure ends whereby the continuous packing material disposed in said horizontally disposed fully packed tube is divided into a like number plurality of contiguous distillation zones.

2. The apparatus of claim 1 comprising boiler means connected to said inlet closure for conveying vapors of said liquid mixture into said tube; a condenser secured to said outlet closure for condensing vapors of the separated low boiling liquid; conduit means for returning a portion of the condensate to said tube and adjacent said outlet closure and conduit means for conveying the liquid in said tube adjacent the inlet closure to said boiler means.

3. The apparatus of claim 1 wherein a uniform particulate packing material is uniformly disposed between said weir and said sump tanks filling the space therebetween.

4. The apparatus of claim 1 wherein the inclined layer of particulate packing material comprises a first inclined layer of suitably sized particulate material and a second inclined layer of suitably sized particulate material contacting said first layer, said first layer being more dense per unit of volume than said second layer for effecting good engagement between liquid and vapor and said second layer being less dense than said first layer for effecting disengagement of liquid and vapor.

References Cited in the file of this patent

UNITED STATES PATENTS

| | | |
|---|---|---|
| 489,147 | Golding | Jan. 31, 1893 |
| 631,461 | Guillaume | Aug. 22, 1899 |
| 651,190 | Ilges | June 5, 1900 |
| 1,466,221 | Foster | Aug. 28, 1923 |
| 1,874,849 | Danforth | Aug. 30, 1932 |
| 1,983,058 | Wait | Dec. 4, 1934 |
| 2,645,467 | Rupp | July 14, 1953 |
| 2,671,053 | Dannenberg | Mar. 2, 1954 |
| 2,698,287 | Dowden et al. | Dec. 28, 1954 |
| 2,863,808 | Markels | Dec. 9, 1958 |